US012592835B2

(12) United States Patent
Bergmann

(10) Patent No.: US 12,592,835 B2
(45) Date of Patent: Mar. 31, 2026

(54) METHOD AND APPARATUS FOR GENERATING, PROVIDING AND DISTRIBUTING A TRUSTED ELECTRONIC RECORD OR CERTIFICATE BASED ON AN ELECTRONIC DOCUMENT RELATING TO A USER

(71) Applicant: MB Automation GmbH & Co. KG, Roding (DE)

(72) Inventor: Mike Bergmann, Dresden (DE)

(73) Assignee: MB AUTOMATION GMBH & CO. KG, Roding (DE)

(*) Notice: Subject to any disclaimer, the term of this patent is extended or adjusted under 35 U.S.C. 154(b) by 162 days.

(21) Appl. No.: 18/552,173

(22) PCT Filed: Mar. 8, 2022

(86) PCT No.: PCT/EP2022/055884
§ 371 (c)(1),
(2) Date: Sep. 23, 2023

(87) PCT Pub. No.: WO2022/200035
PCT Pub. Date: Sep. 29, 2022

(65) Prior Publication Data
US 2024/0187259 A1 Jun. 6, 2024

(30) Foreign Application Priority Data
Mar. 25, 2021 (DE) ..................... 10 2021 107 512.2

(51) Int. Cl.
*H04L 9/32* (2006.01)
*H04L 9/00* (2022.01)
*H04L 9/08* (2006.01)

(52) U.S. Cl.
CPC .......... *H04L 9/3263* (2013.01); *H04L 9/0825* (2013.01); *H04L 9/0866* (2013.01);
(Continued)

(58) Field of Classification Search
CPC ... H04L 9/3263; H04L 9/0825; H04L 9/0866; H04L 9/3236; H04L 9/3247; H04L 9/50;
(Continued)

(56) References Cited

U.S. PATENT DOCUMENTS 11,321,718 B1 * 5/2022 Narendranathan ..........................
G06Q 20/4016
2016/0027546 A1 1/2016 Teshima et al.
(Continued)

FOREIGN PATENT DOCUMENTS

CA          3023325 A1     5/2019
WO    WO-2020023460 A1 *  1/2020    ............. G06F 16/27

OTHER PUBLICATIONS

Loic Lesavre: "A Taxonomic Approach to Understanding Emerging Blockchain Identity Management Systems NIST CSWP 01142020", NIST, National Institute of Standards and Technology (NIST).
(Continued)

*Primary Examiner* — Mohammed Waliullah
(74) *Attorney, Agent, or Firm* — Shumaker, Loop & Kendrick, LLP; John A. Miller

(57)                    ABSTRACT

The solution presented herein relates to a method for generating, providing and exchanging a trusted electronic record or certificate based on an electronic document relating to a user, comprising the steps of: Providing the document comprising information relating to the user in an electronic format; contacting a blockchain held in a network by the user, the blockchain including a smart contract established and programmed to (i) check whether the document proves the user's compliance with a restriction; (ii) verifying fulfillment/non-fulfillment of the restriction by means of the smart contract; (iii) computing a proof by means of the smart contract, and generating a certificate of the proof by means of the smart contract using a crypto- (Continued)

graphic function; and (iv) sending the certificate and the proof by the smart contract to the user.

19 Claims, 1 Drawing Sheet

(52) U.S. Cl.
CPC .......... *H04L 9/3236* (2013.01); *H04L 9/3247* (2013.01); *H04L 9/50* (2022.05)

(58) Field of Classification Search
CPC ... H04L 63/102; H04L 2209/56; G06F 21/45; G06F 21/64
See application file for complete search history.

(56) References Cited

U.S. PATENT DOCUMENTS

| | | |
|---|---|---|
| 2017/0078087 A1 | 3/2017 | Chalker |
| 2021/0081366 A1 | 3/2021 | Madisetti et al. |
| 2022/0198458 A1* | 6/2022 | Narendranathan ..... G06F 21/64 |

OTHER PUBLICATIONS

Halpin Harry: "Nym Credentials: Privacy-Preserving Decentralized Identity with Blockchains", 2020 Crypto Valley Conference on Blockchain Technology (CVCBT), IEEE, Jun. 11, 2020 (Jun. 11, 2020), Seiten 56-67.

* cited by examiner

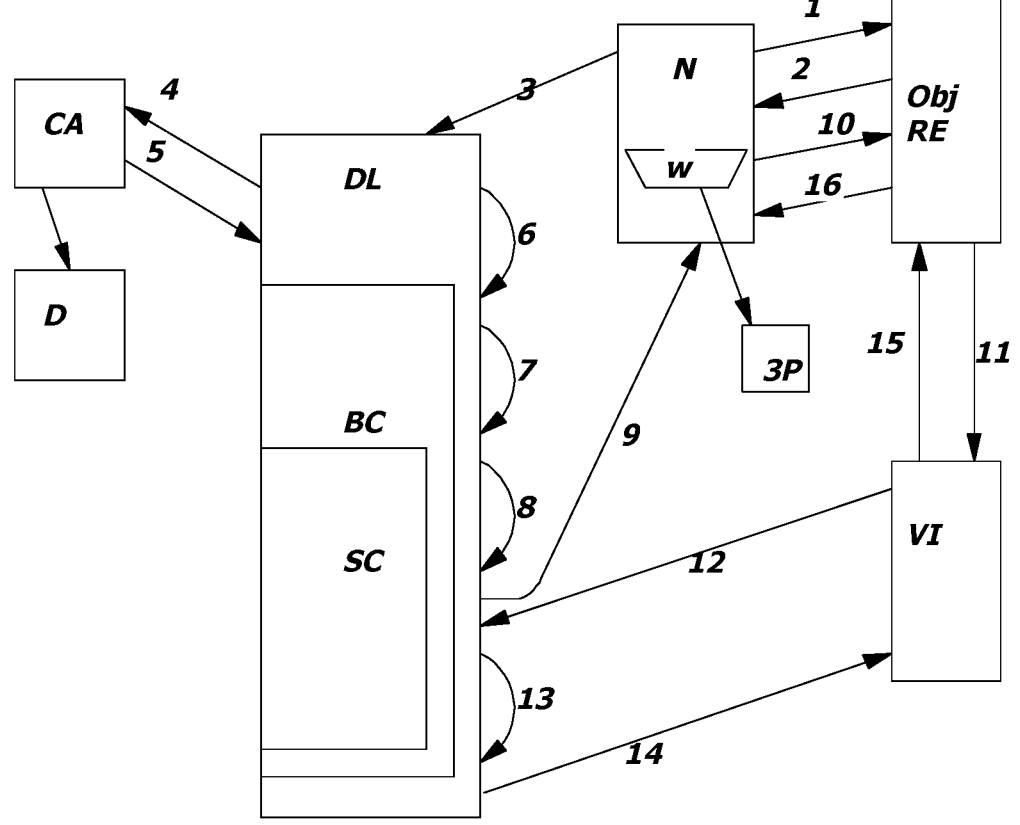

METHOD AND APPARATUS FOR GENERATING, PROVIDING AND DISTRIBUTING A TRUSTED ELECTRONIC RECORD OR CERTIFICATE BASED ON AN ELECTRONIC DOCUMENT RELATING TO A USER

CROSS-REFERENCE TO RELATED APPLICATIONS

This application is a National Stage application of International Application No. PCT/EP2022/055884 filed on Mar. 8, 2022, which claims priority to German Patent Application Serial No. DE 10 2021 107 512.2 filed Mar. 25, 2021.

BACKGROUND

Field

Here, the generation, provision and forwarding of a trustworthy electronic record or certificate based on an electronic document relating to a user is disclosed. This is to be implemented as a device and a method. Characteristics and features of the device and the method are defined in the claims, but also the description and the FIGURES disclose characteristics of the device and the method as well as their different aspects and interrelationships.

Discussion of the Related Art

Conventional officially issued documents (passport, ID card, driver's license, birth or marriage certificate, school or university diploma, etc.) contain a collection of predefined data records (name, address, date of birth, blood group, vaccination status, family lien status, fingerprint, iris image, etc.). The presentation of such a document by its holder to a third party (authority, business partner, etc.), for example to prove age or nationality, is common and serves its purpose. However, by presenting the document as a whole, the holder usually provides the third party with more information (secondary information) about him/herself than is necessary in the current situation.

If, for example, such a document is used by the buyer to prove that he or she is of age when purchasing age-restricted goods (e.g. drink and tobacco), the seller can obtain much more information about the buyer (first and last name, day, month, year of birth, place of residence, nationality, etc.) than is required for the specific proof (buyer is of age). Proof of creditworthiness, for example of a buyer for a conclusion of a contract of sale of an apartment, or proof of income of a tenant for a conclusion of a lease contract, currently require a letter from a bank or an employer, respectively. In addition to the currently required scope of creditworthiness, various other information can be obtained from such a letter.

A mobile ID solution, e.g. MB TECURE ID (https://www.muehlbauer.de/solutions/id-card-solution), processes digital representations of officially issued and certified documents such as proof of identity, driver's licenses, etc. These documents often include a photo of the holder, name, address, nationality, gender, date of birth, driving license classes, issue and validity dates, and more. A mobile ID is generated from the information in the respective document, which is stored and held on a traveler's mobile device. This mobile ID replaces a multitude of inhomogeneous travel documents; it allows a convenient, contactless and data-protection-compliant procedure for secure identification of the traveler.

The following steps are used to check the identity of a person and/or grant rights to a person: During authentication, a user provides proof of his or her identity to be verified by the system. An authentication represents the actual verification of the identity claimed by the user. Authentication is performed by a trusted entity. This trusted entity verifies or falsificates the user's identity based on the characteristics contained in the proof. After he follows richly completed (verified) authentication, the authorization process grants the user zer the rights he has requested. A traveler can authenticate himself—actively—at the station with his passport and ticket. The rail station/train personal authenticates the traveler—passively—on the basis of the documents he or she presents. Thus, the sender is authorized to travel by his or her ticket.

In known electronic solutions, the authority/employer issuing the document can be contacted for such scenarios and asked to issue a dedicated certificate with a dedicated signature for this document. This requires a central infrastructure and is not privacy-friendly because the connection data (metadata) reveals information that is not required in the specific situation (for example, geo-location, date and time, type of certificate). Self-signed certificates are another option. However, these certificates offer only low security because the authenticity of the certificate's content is not proven.

Public Key Infrastructure PKI refers to a system that is capable of generating, distributing and verifying digital certificates. These certificates serve as a digital identity for per sons. An asymmetric cryptosystem can sign and encrypt messages to be sent electronically. In this form, a signed message actually originates from the specified sender. To verify this, the sender's public key (public key), which can be sent by e-mail, for example, is required. To ensure that it is actually the sender's key, the key to be schi cken itself can be signed with a trusted key. In this way, a hierarchy of trusted institutions must be established, and the authenticity of the key of the top institution in this hierarchy must be accepted. Digital certificates are digitally signed electronic data used to prove the authenticity of objects. A certificate authority (CA) is an entity that provides the certificate and assumes the Signature of certificate requests. A PKI offers a hierarchical validity model. If a certification authority is trusted, all certificates signed by it are also trusted. Since a CA can have subordinate CAs, all subordinate CAs are also trusted.

Personal data should be able to be issued to a third party while maintaining or only slightly weakening the completeness and correctness (integrity) of the data, the authenticity of the person or IT component or application involved, the protection against unauthorized disclosure of the data, and/or the anonymity of the issuer. In this context, the release of meta-data in connection with the data release to the third party must also be avoided.

SUMMARY

As an embodiment of a solution, a method is disclosed that is at least partially implemented as a logic (in hardware and/or software) in a portable device of a user. The part of the logic implemented in the portable device is set up to communicate with further parts of the logic implemented in remote portable or stationary devices/in cloud computing via a network/data connection.

In one variant, the portable device is a mobile device (smartphone) that is set up to run a so-called app, i.e. application software for the portable device with a mobile operating system designed for it. In this app, the part of the procedure to be solved/executed by the user is to authenticate, verify and present to a third party the user, his data or parts thereof in a user-friendly, privacy keeping, trustworthy and situation-appropriate manner. The procedural steps required for this are carried out in a decentralized manner. In one variant, cloud computing offers a decentralized execution via a network on demand, at any time and anywhere, with simple and rapid access to a shared pool of computer resources (networks, servers, storage systems, applications and services) that can be configured as required.

Instead of the portable device, a stationary computer resource can also be seen by the user before, which provides the user with the functionality required for this solution.

The following resources are to be used for the logic steps to be executed inside and/or outside the portable device app.

In a so-called distributed ledger (distributed digital analog to an accounting journal), data records are distributed in a peer-to-peer network (P2P network). In this process, nodes of the network jointly decide on updating the data by agreement (consensus). The data can be, for example, account balances of a cryptocurrency, proofs of origin for goods, the contents of officially issued documents mentioned above or, more abstractly, contract states of so-called smart contracts.

In the solution presented here, a calculation rule is stored in the distributed ledger as a program or script (see below). In one variant, this program or script is used to authenticate and/or verify an input value. Thus, the distributed ledger does not contain a static value or date. Rather, a smart contract (see below) stores how, for example, based on a user's officially certified date of birth, a query regarding the user's age of majority is to be answered (with yes or no), without later revealing the user's date of birth itself.

This clearly defined, binary answer to a question—possibly even a complex one—is determined by a computation rule in the smart contract that is checked by miner in the network (see below). This answer is transmitted as a certified/encrypted message to the answer (is of full age, has a driver's license of class B, etc.) in relation to a document and/or an identity reference (name). This response is used for presentation to a third party and provides a simple and reliable handling in digital traffic.

In a distributed ledger, there is no central communication control and no central storage of data sets. The nodes of the network each maintain a local copy of the complete data set and can add new data sets themselves. A suitable consensus mechanism ensures that the distributed data sets in all nodes are up to date and match, and the distributed ledger as a distributed data structure is thus always kept in a consistent state. Smart contracts are stored in the distributed ledger as programs/scripts that have been checked by the miners and can no longer be changed and are kept consistent.

Cryptographic methods are used to secure access to the network, the data structure, the data sets and consensus building for the required security (especially integrity and authenticity). Rules for validation, storage and use of the data are coded in various forms in the data sets themselves and are executed and enforced automatically by the network during processing.

In blockchain technology, data records are validated as transactions in a blockchain network and combined into blocks. Through crypto graft chaining, new data blocks (transactions) are linked to their predecessors in the chain in a tamper-proof manner. This chaining also determines a chronological order of the transactions. As a special case of a distributed ledger, this creates a longer chain of data blocks, a so-called blockchain. Typically, each block of the blockchain contains a cryptographic hash of the previous block in the chain, a time stem pel, and one or more data records. For use as a distributed ledger, a blockchain is maintained on the blockchain network, where all nodes collectively follow a protocol for validating new blocks. A blockchain is inherently resistant to modification of records because once they are added to the blockchain, they cannot be changed retroactively without changing all subsequent blocks. This would de require consensus among the majority of nodes in the network.

A transaction also refers to information managed or to be processed in the distributed ledger/blockchain. The term wallet describes, on the one hand, a digital wallet, for example in a mobile device, for a user's access data and secrets, and, on the other hand, a general user interface to the blockchain network via which the user can manage his access data and secrets and participate in the system. A network node or actor in the network that is allowed to add new blocks to a blockchain is also called a miner.

One or more smart contracts can be stored in a distributed ledger. Smart contracts are not contracts in the legal sense, but computer-based executable instructions. A smart contract therefore contains one or more executable programs. A smart contract is intended to enable tamper-proof actions or transactions between persons who do not or do not trust each other. Such a smart contract has its own address for interacting with the smart contract.

The program code of the smart contract is sent to the blockchain in a transaction and executed by the network nodes as part of the validation process. The smart contract is invoked by a transaction. A data record is also entered into a smart contract by means of a transaction. In variants of the smart contract presented here, its invocation can be registered and monitored. However, it is also possible to call the smart contract completely anonymously in order to avoid disclosure of the data. An invocation counter to represent the reputation of the smart contract can additionally be implemented. Since a blockchain is immutable, subsequent changes to the program code are impossible.

An independent entity, the issuing body of a document (ID card, passport), the user or the verifying third party can create a smart contract, have it verified, certified and subsequently used by the miner's network.

A smart contract can be programmed as a script in a stack-based scripting language, for example, or as a sequence of instructions in a compilable programming language, for example Solidity, Go, Java, Node.js or the like. The compiler generates a bytecode. This bytecode or script is sent to the network as a standalone transaction without specifying a recipient address. A miner assigns a newly generated address to the smart contract and publishes the program code in the blockchain. A transaction to the address of the smart contract results in its execution by the miner when the transaction is included in a block and subsequently by any other node when it is verified.

Alternatively, the client of a smart contract only commissions some of the network nodes/miners to execute the smart contract. These network nodes first simulate the execution of the smart contract locally and report the result back to the client without anchoring it in the blockchain. If there is a sufficient number of matching responses, a transaction is set up and sent to another group of network nodes. This group decides on the order in which received transactions are included in the blockchain without validation or content evaluation. This validation is performed by all network nodes when they update their local copy of the blockchain.

The rules contained in the smart contract can also be executed outside the blockchain on an API (application programming interface, which is made available by a software system to other programs for connection to the system); only the commands that relate to specific blockchain operations, such as a transfer of values, are forwarded to the blockchain as a transaction and entered there. In this way, the program code can be subsequently changed, since it is not itself on the blockchain. The principle of unchangeability is abandoned in favor of possible error correction.

In even more detail, based on the infrastructure explained above, the following interaction of the individual functions results:

A single blockchain has at least two blocks. Each block contains the hash value of the previous block. This creates a chain dependency that protects against illegitimate modification of a transaction in a block by requiring recalculation of each block created after the modified block. Transactions exchanged between the nodes of the network are stored in the blocks of the blockchain. Here, each transaction can contain user data and a digital signature, e.g., the encrypted hash value of the user data. A transaction can be defined as $Msg=D+h(D)$, where Msg denotes the message, D stands for the data set contained in the transaction, and $h(\ )$ denotes a hash function.

New blocks are created by a consensus process among the nodes of the network and, once created, new blocks are appended to the blockchain. A typical consensus procedure is the so-called proof-of-work procedure, which corresponds to the search for a hash value with a certain requirement, i.e. the search for a hash value that results after applying a hash function to the entire content of a block. The difficulty of computing this hash value is determined by the number of zero bits that must be present at the beginning of the hash value. This number of zero bits is also referred to as the difficulty level. By a higher/lower number of zeros at the beginning of the hash-value, the computational effort can be increased/decreased. A so-called "nonce", i.e. a random value that is part of a block, can be used to calculate the hash value. The nonce is randomly modified in the proof-of-work process to find the desired target hash value for the entire block. Different hash values can thus be obtained by modifying the nonce and/or adding new incoming transactions. Finding the solution in the proof-of-work procedure usually involves a lot of computational effort. The proof-of-work method is not the only consensus method used; other methods such as proof-of-stake, proof-of-capacity, proof-of-burn and proof-of-activity are also used.

In the blockchain network, miners are nodes that calculate blocks, i.e. they also participate in the proof-of-work process. To compute a new block, miners can collect all current transactions that are not yet in the blockchain and combine the hash values obtained from the transactions with the hash value of the preherigen block, the timestamp and the nonce. Next, a hash function is applied to these combined records, yielding a hash value of the new block. Miners perform this calculation repeatedly (by changing the nonce and/or adding new incoming transactions) until a solution is found for the proof-of-work. The first miner to find a solution broadcasts the calculated block to the other nodes in the network. When the other nodes validate the block, the transaction is added to the blockchain.

To add a new transaction to the blockchain, the following steps are typically performed on the blockchain network: (1) The new transaction is broadcast to the network by the originating node and received by all nodes. (2) The transaction is validated by all nodes and each node broadcasts the result of the validation, i.e., indicates whether the transaction is considered valid/validated or not. (3) If the transaction is accepted, i.e., the majority of nodes determine the transaction to be valid/validated, the miners start computing the block e.g., (4) the first miner to find a solution (e.g., for proof-of-work) broadcasts the computed block to the network. (5) The other nodes validate the solution and send the validation result to the network, i.e., indicate whether the solution is accepted or rejected. (6) If the solution is accepted, i.e., the majority of nodes accept the solution, the block is added to the blockchain and the nodes update their distributed ledger accordingly. The validation of the transaction in step (2) above can be performed using known digital signatures. For example, each transaction can be digitally signed by the originating node of the transaction by applying a hash function to the record of the transaction and encrypting the obtained hash value with the private key of the originating node tens. The receiving nodes can then validate the transaction by decrypting the digital signature with the public key of the originating node, calculating the hash value of the record, and comparing the received hash value with the calculated hash value.

From a technical point of view, the solution presented here combines certificate storage with a distributed ledger, in particular a blockchain. At least one smart contract is stored in the distributed ledger/blockchain. The program or script or sequence of instructions contained in this smart contract is used to issue certificates with distributed trust. In particular, the smart contract specifies how and under which conditions the data record contained in the certificate to be issued is to be calculated.

The solution presented herein relates to a method for generating, providing and issuing a trusted electronic record or certificate based on an electronic document relating to a user, comprising the steps of:

providing the document comprising information pertaining to the user in an electronic format;

contacting a blockchain held in a network by the user, the blockchain including a smart contract established and programmed to (i) verify that the document evidences the user's compliance with a restriction; (ii) verifying fulfillment/non-fulfillment of the restriction by means of the smart contract; (iii) computing a proof by means of the smart contract, and generating a certificate of the proof by means of the smart contract using a cryptographic function; and (iv) sending the certificate of the proof by the smart contract to the user.

The solution presented here includes that the blockchain held in the network/computing and/or network resources is part of a distributed ledger.

In addition, in one variant of the solution presented here, a hash value calculated by the smart contract is stored in another blockchain in order to generate another characteristic of authenticity independently of the cryptographically generated proof.

The solution presented here uses the smart contract in the blockchain to calculate the certificate.

Instead of the certificate of the proof to be sent by the smart contract to the user, in a variant of the solution presented here a hash is used as proof that (i) the calculation of the proof by means of the smart contract has taken place, and (ii) that nothing has been changed.

In one embodiment, the solution presented herein comprises, prior to contacting the blockchain held in the network work, initiating an interaction with a further person by the user; and/or notifying the user of the restriction of the interaction by the further person, wherein the fulfillment/non-fulfillment of the restriction by the user is to be evidenced by the document.

In a further variant, the solution presented herein comprises, after the hash value of the proof is sent by the smart contract to the user, (i) the user sending the hash value of the proof to the further person; (ii) the further person checking the hash value of the proof; and/or (iii) the further person causing, depending on the result of the checking, execution or refusal of the interaction initiated by the user.

In yet another embodiment, the solution presented herein includes the smart contract being set up and programmed to generate a derived trusted certificate to the computed proof and the generated hash value of the proof.

The distributed ledger is transparent to each party with regard to the smart contract and enables validation of both itself and the calculation instructions. In this context, the security and privacy of the data are preserved when accessing the user's documents to the extent requested or defined by the user, without having to disclose the underlying document or any data element contained therein. For example, age queries (user is older than x years) do not require disclosure of the date of birth as a whole (day/month/year). Instead, the solution presented here generates a secure yes/no statement from the user's certified date of birth. Similarly, in a creditworthiness check for an apartment purchase, the bank provides a statement confirming/denying the specific query value (user has a creditworthiness >€150000) instead of the bank statement. Using the blockchain functionality, the smart contracts can be extended to include other properties of the user (is socially insured, is a citizen of country XX, has a driver's license of class YY, has a residence permit in country XX on date ZZ, etc.).

The level of assurance is determined by the trust offered by the distributed calculation or the network of miners. The hashing of the smart contract and its storage in the distributed ledger guarantees a level of assurance that results from the proportion of miners in relation to all nodes in the network. This ensures that the calculated value corresponds exactly to the calculation instruction of the smart contract and that the validation of the smart contract and the calculation result is reliable.

As a result of the calculation, a new credential is provided, with a certification from the blockchain network. The certificate can be stored in the user's wallet and used later if this type of certification is required. The certificate, once generated, can be shown multiple times later. The certificate itself can also be timestamped so that a third party can evaluate the certificate accordingly. A count of the calls to the smart contract can be stored in the blockchain, which can be used to document the reputation. The certificate always contains the address of the smart contract for subsequent verification by the verifier.

In one variant of the solution presented here, the provision of the document comprises such a document in which at least information relating to the user is certified, signed, and/or authenticated in the electronic format.

In a variant of the solution presented herein, contacting the blockchain comprises transmitting, by means of an electronic data communication, information by the user (i) identifying the user; (ii) about the document; (iii) about the smart contract to be used to verify the restriction; and/or (iv) about the restriction; over a network to the blockchain.

In one variation of the solution presented herein, to verify compliance with the restriction, the user sends, by means of the smart contract, (i) to the smart contract, at least in part, the document; and/or to the smart contract, access data to at least a portion of the document; over the network to the blockchain.

A variant of the solution presented here comprises, for checking the fulfillment of the restriction of the smart contract, a program code or a script with instructions for (i) checking at least one certificate, signature and/or authentication of the document; (ii) calculating the proof based on the result of the verification of at least one certificate, signature and/or authentication of the document; and/or (iii) signing the proof by means of a preferably part cryptographic function by generating a signature of the proof. A signature has the merit of being used to prove who computed the hash. The smart contract SC is stored in the blockchain BC. The signature can be generated centrally or distributed, both are possible.

In a variant of the solution presented herein, sending the certificate of the proof through the blockchain to the user comprises transmitting the certificate of the proof by means of electronic data communication over the network to (i) store the certificate of the proof in a wallet held in a mobile device or a stationary computer resource of the user so that this certificate of the proof is accessible to the user for further processing; and/or (ii) send the certificate of the proof, with or without prior storage in the wallet, from the user's mobile device or stationary computer resource over the network to the additional person without any action by the user.

In one variant of the solution presented here, the provision of the document comprises such a document in which (i) at least information relating to the user is certified, signed, and/or authentificated in the electronic format using a preferably biometric ID document by an official authority or a trusted partner; and/or (ii) at least information relating to the user is stored in an electronic proof of identity and/or an eID server with functional eID interface for external access.

In one variation of the solution presented herein, the (i) smart contract in the blockchain is programmed and set up to access the information pertaining to the user in the electronic proof of identity and/or the eID server for restriction verification, and/or (ii) the information pertaining to the user is held as a mobile ID in its wallet by the user ready to be sent over the network to the smart contract in the blockchain.

In one variant of the solution presented here, a smart contract validated by miners in nodes of the network is used as the smart contract, which is programmed and set up to compare information relating to the user in the document with the restriction transmitted to the smart contract in terms of its fulfillment. In this context, the smart contract may be programmed and set up to send a presence/absence of fulfillment of the restriction to the user after the smart contract has calculated the proof and generated the certificate of the proof using the cryptographic function. In addition or instead, the smart contract can be programmed and set up to transmit further information from the document that can be defined in terms of scope by means of information sent to the smart contract.

In one variant of the solution presented here, the smart contract is programmed and set up to (i) certify, sign, and/or authenticate for the information relating to the user, and to the extent specified in terms of scope, further information from the document, and/or to generate new certified, signed, and/or authenticated data elements that are fully verifiable by third parties through independent access to the smart contract in the blockchain and verifiable in terms of the authenticity of the dated elements.

In one variant of the solution presented here, the smart contract is programmed and arranged to send to the user the presence/absence of fulfillment/non-fulfillment of the restriction by the user in a form that has the same level of assurance as the document used to check the restriction by means of the smart contract; and/or wherein the smart contract is programmed and arranged for the user to initiate (i) the calculation of the proof by the smart contract, (ii) the generation of the certificate of the proof by the smart contract by means of a, preferably distributed, cryptographic function, and/or (iii) the sending of the certificate of the proof by the smart contract to the user himself.

In one variant of the solution presented here, a public key cryptography/digital signatures and/or cryptographic hash functions are used as cryptographic functions. In one variant, public-key cryptography generates a key pair mathematically linked by a computation before writing with a private key and a public key. In a variant smart contract, and generating a hash value of the proof by the smart contract using the key pair. In one variant, the key pair is used to create a digital signature by the user signing the transaction with his private key, which only he has, and sending the resulting signed message to the smart contract. In another variant, the smart contract is set up and programmed to generate a hash value from the transaction, which is then encrypted with the private key. A third party can then use the public key to decrypt the hash value and check whether it matches the transaction. In another variant, the smart contract is set up and programmed to sign the sen with the digital signature before sending the hash value of the proof. In one variant, the smart contract is set up and programmed to check the transaction with the public key of the user and to verify the authenticity of the transaction if the two keys match correctly. In one variant, after the transaction has been signed by the smart contract, the transaction must be checked for content integrity by the user and/or the third party.

In one variant, the smart contract is set up and programmed to generate the hash value and/or the certificate of the proof using a cryptographic hash function, whereby a string with a fixed length (=hash value) is generated from the proof, which is a string of any length, by a requirement of the hash function. The hash function is deterministic. Based on the hash value generated, the proof cannot be determined, especially not with reasonable effort. It is not possible, especially not with reasonable effort, to find a second, different proof that yields the same hash value of the proof. It is not possible, in particular not with considerable effort, to find two different proofs that yield the same hash value of the proof. In one variant, the hash function implements an algorithm based on e.g. SHA-2 or SHA-3.

In one embodiment, the blockchain containing the smart contract implemented in a distributed ledger is implemented as a permission-based public blockchain, a permission-based private blockchain, or a permission free public blockchain.

Also disclosed herein is a portable device adapted to execute logic in hardware and/or software in which the method according to any of the preceding variants is implemented. The logic is adapted to perform one or more of the method steps according to one of the preceding variants either with resources of the portable device from, or to communicate via a network with remote resources for executing one or more of the method steps. In particular, in the portable device, procedural steps of the logic to be triggered or executed by the user can serve to authenticate, verify and present the user, his data or parts thereof to a third party, and further procedural steps of the logic can be implemented in a decentralized manner as cloud computing and/or in nodes of the network, in particular also in nodes acting as miners.

Also disclosed herein is a wallet implemented as a database in a portable device arranged to execute logic in hardware and/or software in which the method according to any of the foregoing variants is implemented, and wherein the logic is arranged to execute one or more of the method steps according to any of the foregoing variants either with resources of the portable device, or to communicate via a network with remote resources for executing one or more of the method steps. In particular, a memory may be provided in the portable device for storing the digital certificate of the proof transmitted by the blockchain to the wallet of the user by means of electronic data communication over the network.

The portable device can be programmed and set up to cause the storage and/or forwarding of the digital certificate of the proof in the wallet by means of a user interface to use of commands, and/or to send the digital certificate of the proof with prior storage in the wallet from the user's portable device to the other person via the network without any action on the part of the user. The information relating to the user can be held in the user's wallet as a mobile ID ready for transmission via the network to the smart contract in the block chain.

BRIEF DESCRIPTION OF THE DRAWING

Further features, properties, advantages, usefulness of the devices and the methods can be found in the following description in conjunction with the drawing. Possible variations will also become clear to a person skilled in the art on the basis of the description following, which refers to the accompanying drawings. The FIGS. illustrate embodiments of the solutions discussed here.

FIG. 1 shows a sequence of steps of a variant of the method disclosed here.

DETAILED DESCRIPTION OF THE EMBODIMENTS

The solution presented here is used to generate, provide, and maintain a trustworthy electronic record or certificate based on an electronic document D relating to a user N. For this purpose, individual entities and their interaction with one another are illustrated as individual steps in FIG. 1.

A validated smart contract stored in a distributed n ledger is used to derive attributes of the credential holder/user in a privacy-friendly manner without revealing any side information. The validated smart contract verifies the official signatures of the data elements/information INFO of the document D and calculates and generates new certified data elements (over/under an age limit, nationality, citizenship, . . . ) that can be verified by a third party through an electronic request fra ge to the distributed ledger. The smart contract and the results of its calculations are protected by strong cryptography. This means that the same level of security can be achieved for the derived data as for the source data. Any third party who is granted access to the distributed ledger can verify the authenticity of these credentials.

In this way, the user N can generate credentials based on officially certified rights credentials. In doing so, the privacy of the user N is preserved as much as possible. In the solution presented here, the derived credentials have the same or a similar level of assurance (loa) as the source credential used to generate them, even though they were not generated by an authority or the like. Rather, the user N himself causes the generation of the derived credentials by the smart contract.

The present solution enables the user N to have a self-signed certificate issued that maintains the level of security of the original data or is not significantly weaker in comparison. In doing so, the generation and accumulation of metadata is reduced. This also makes it impossible to trace who requested which data and when, etc.

A digital wallet with officially signed certificates presented here is also used for this purpose. The solution calculates and derives signed certificates as a result of the calculations of a smart contract, which are stored and (also publicly) available in a distributed ledger. In the variants presented here, the distributed ledger is a permission-based public fent block chain. Other variants with which the solution presented here can also be realised are a permission-based private blockchain or a permissionless public block chain.

The distributed ledger makes the smart contract SC transparent for each trusting party and allows the validation of the smart contract SC and the calculations contained in it. Validation schemes can be used to prove the origin of the underlying certificates. In this way, the loa is preserved without the data element underlying being disclosed from, for example, an e-passport of the user N. To answer a posed query (e.g., is the user of legal age? "isOfLegalAge ( )"), a certified data element, in this case the date of birth of user N, is used in a calculation with the smart contract SC. FIG. 1 illustrates the process. The smart contract SC can be extended by relying parties using blockchain functionality to include additional properties such as "isMarried( )", "isOver24( )", "isEuropean( )", "isHealthInsured( )", etc.

From the trust that the distributed computation (and the (strong) encryption) offers, the loa results. Hashing the smart contract and storing it in the distributed ledger guarantees the loa as long as more than half of the miners are independent. The smart contract guarantees that the calculated value belongs exactly to the calculation instruction of the smart contract, and that the validation of the smart contract and the proof to are reliable.

The result of the calculation becomes a new proof with a certification from the blockchain network. The certificate can be stored by the user N in the wallet and used later when requested. The proof generated once can be shown multiple times. The proof itself contains a timestamped certification. In this way, the authority to which the proof is presented can evaluate the credential accordingly.

The starting point is that the user N is identified by a trusted Certificate Authority, e.g., an official authority (government), (i) with an ID document, (ii) an ID card/deed (passport, ID card), or (iii) with biometric data. Alternatively or cumulatively, the user N has a digitally signed certificate from the Certificate Authority entity in an eID document or in an authorized database. Alternatively or cumulatively, the user N has a digitally signed certificate in a digital wallet as a mobile ID in his smart phone or as a software wallet in a computer. The digitally signed certificate is accessible to the user for further processing.

As an example, let it be envisaged that user N wishes to rent an object Obj. To do so, user N makes a request to the owner of object Obj electronically, e.g., using his smart phone or wirelessly or wired. (FIG. 1, step 1)

In response, the user N receives electronically that in order to rent the object Obj must prove to fulfill the restriction RE, to be 24 or older. (FIG. 1, step 2)

To provide this proof, user N connects electronically to a blockchain BC and provides the blockchain BC with his or her date of birth and passport ID including si ve official signatures. (FIG. 1, Step 3)

The blockchain BC includes a smart contract SC. This smart contract SC checks the Signatures and calculates the proof. The proof is signed by the blockchain BC using a parted cryptographic function. (FIG. 1, steps 4-8)

The signed proof is sent back to the user N. User N places the proof in his wallet for further use. The wallet can be configured to automatically forward the proof to the instance that requested the proof, in this case the object Obj. (FIG. 1, step 9)

The proof is forwarded either automatically or manually by the user N to the instance that requested the proof. The instance can now check the signature of the proof and decide on the access decision. (FIG. 1, steps 10-16)

The procedure in detail is as follows:

In step 1, user N electronically accesses an object Obj that is protected by a restriction RE. The object Obj can be a rental agreement for an apartment. The restriction RE is that the tenant must be 24 years old or older.

In step 2, the object Obj informs the user N electronically that he has to provide a proof that the tenant 24 of the apartment must be years old or older.

In step 3, user N contacts a distributed ledger DL. This distributed ledger DL includes a blockchain BC. This blockchain BC includes a smart contract "over23 proof". Thus, user N can generate (have generated) a proof that he meets the restriction RE of being 24 years old or older without having to disclose his date of birth (day, month, year) to the landlord.

In step 4, the smart contract SC requests the public key of the signatory of document D (the certification authority CA) in order to verify authenticity. The smart contract SC usually obtains the public key from an exchange platform PKD public key directory of the certification authority CA Subscribers store their public keys there so that messages to them can be encrypted with these public keys. Decryption is only possible at the recipient's site using the recipient's private key. This mechanism can also be used to generate digital signatures, in which case a signature is generated with a private key and verified with the corresponding public key.

These signatures prove whether a message originates from the specified sender or whether it has been modified by an unauthorized person: for example, whether data has been written to an electronic passport by the respective authority or whether it has been manipulated.

A digital signature is based on asymmetric encryption, in which a sender calculates a value for a digital message with the help of its private key. This value is called the digital nature of the message. Using this value and the public key, third parties can verify the non-repudiable authorship and integrity of the message. In order to be able to assign a signature created with a signature key to a person, the public key must be assigned to this person without any doubt. The signature is calculated from the digital message to be signed and the private key using a unique calculation rule. Different digital messages must lead to a different signature with a probability bordering on certainty, and the signature must result in a different value for each key. In the case of a digital signature, the private key is usually not applied directly to the message, but to its hash value, which is calculated from the message using a hash function (such as SHA-2, SHA-3 or the like). If the public key has been assigned to a person by means of a digital certificate, the identity of the signature creator can be determined and verified via the public directory of the certification service provider, since there is only one private key corresponding to the public key. The entire technical infrastructure used to generate certificates and information on their validity and make them available to the public is known as the PKI (Public Key Infrastructure).

The authenticity of the sender is essential here, i.e., proof that a from sender of a public key is actually who he claims to be. The public key infrastructure PKI makes it possible to ensure the trustworthiness of a public key by obtaining it from a trusted key directory. In the public key directory exchange platform, issuers of documents can publish their public keys, which are required for verification. The smart contract SC can then obtain the public key from the platform.

of the date of birth in the document D, the correctness and trustworthiness of which is proven by the encryption with the public key and the authenticity of the document from the certification authority CA. The INFO information reaches the smartcontract SC from the document D from the certification authority CA in the manner shown below. Here, the required data is made available directly to the smart contract SC. The responsible public key directory PKD is previously entered in the smart contract SC. In another variant, the document D already has the necessary certificates. This eliminates the need for further services. The smart contract SC can be preceded by a dictionary function that provides the user with information on which smart contract SC might be most suitable for his request.

Pseudo Code to Generate a New Certificate

```
// The date is signed, the certificate for it is provided.
// The certificate indicates the issuer and the validity period of the certificate.
// The date in the certificate corresponds to the information in the machine readable
zone, MRZ, of a passport.
// or ID card whose hash is stored in the document security object, SOD of the
passport or ID card signed //.
let DG1 = ["IDD<<1234567897<<<<<<<<<<<<<<<",
      "9701218F2026031D<<<<<<<<<<<<<0",
      "MARTINA<<SPECIMEN<<<<<<<<<<<<"];
let SOD = [ hashDG1 = "596BAE8E7BA9F4D6FC9A468251B3B08A", // MD5 hash
as example.
      ...     // further hashes of further data groups
      sodSignature = "SidcJvN0zGHGaTtmcmuUVIS6BG1Lf2o9hbFT9ND08T8=",
      sodCertificat = "The Certificate to prove the signature, optional.... "];
let personalData = [DG1, SOD];
// This address is assigned by the BC and is unchangeable
const SC_ADDRESS = "ID_OF_THE_SMARTCONTRACT";
// the government CA, if no certificate is available
const govCA = RESPONSIBLE_COUNTRY_CA;
var certificate = undefined;
// Auxiliary constant for age comparison
const ticks24years = clockTicksfor24Years( );
// Structure for recording the certified result (analogous to SOD)
class SignedResult = {result, scAddr, signature, certificate};
// Auxiliary function for checking the certificate
function boolean checkSignatureOfData(signedData){
   if (hasCertificate(signedData) ){
      certificate = getCertificateFrom Data(signedData);
   }else(
      certificate = getCertificateFromPKD(govCA);
   )
   return isValid(signedData, certificate);
}
function SignedResult generateSignedResult( result, addr ) {
   // an external trusted service is called in the SC which signs the result of the SC
   var signature = callTrustedSignatureService(result, addr );
   return new SignedResult( result, addr, signature, certificate );
}
function SignedResult over23( personalData ) {
   // Check the validity of the signature
   if (checkSignatureOfData( personalData ) )
   {
      var DateOfBirth = extractDoB(personalData);
      boolean res = ( (now( ) – DateOfBirth) > ticks24Years );
      // optionally the timestamp can be included in the result
      result = [res, timestamp ];
      return generateSignedResult( result, SC_ADDRESS );
   }
}
```

In step 5, the public key is transmitted to the smart contract SC.

In step 6, the smart contract SC checks the signature of the certification authority CA under document D. If the signature is valid, the next steps are executed. If not, the execution terminates here.

In step 7, the age check is performed based on the calculation rule in the smart contract SC and the indication Pseudo Code to Validate the Certificate

```
// Signature verification function
function boolean isSCCertificateValid( scCredential ){
   result = scCredential.result;
   address = scCredential.scAddr;
   signature = scCredential.signature;
```

-continued

```
cert = scCredential.certificate;
return (callTrustedSignatureService(result, address ) == signature);
}
```

In this way, the smart contract SC calculates the fulfill-ment of the restriction RE by the user N on the basis of a document D prepared by the certification authority CA, for example an e-passport document, or more precisely an INFO information relating to the user N in an electronic form mat in the document D. The result of this calculation is a true/false statement. In the present case, the date of birth (year-month-day) of user N, as it can be taken from his e-passport document D, is subtracted from the current day date (year-month-day) and the result is compared with 23 years. If the result is greater than 23, the smart contract SC will give a "True"; if the result is less than 23, the smart contract SC will give a "False". Instead of this example, a smart contract SC with any other functionality/test capabil-ity could also be executed.

In step 8, the result is signed. The trust basis of this approach is the distributed ledger DL. Each participant can view the smart contract SC and validate it. A dedicated distributed hash for tamper detection protects each smart contract SC. The result of the calculation is bundled with an ID of the user. Through this, the ID of the user N and the proof are linked to the ID of the smart contract SC, more precisely the address of the smart contract SC, to document the origin of the result of the computation. For this triple <ID, SC-result, SC-hash> the distributed ledger DL derives then a hash value to testify the authenticity of the triple. The triple cannot be modified without destroying the hash of the distributed ledger DL. The distributed ledger DL consensus is a proof-of-work in one variant and a proof-of-stake in another variant.

In step 9, the triple <ID, SC-result, SC-hash> is sent back to user N electronically as the result of the calculation by smart contract SC. User N can now store the result in his wallet.

In step 10, the result of the calculation is sent electroni-cally by the user N to the object Obj. This can be triggered manually by the user, or automatically by following the forwarding based on stored preferred settings he as soon as the result of the calculation has reached the user N elec-tronically and is stored in his wallet.

In step 11 a verification request checks the validity of the proof from the object Obj. Alternatively, the proof from object Obj can be forwarded to a dedicated verification instance VI for verification.

In step 12, the dedicated verification instance VI checks the validity of the hashes and the signature by means of a request to the distributed ledger DL.

In step 13, validation is performed by checking the authenticity of the triple <ID, SC-result, SC-hash> and the triple signature. For this purpose, the distributed ledger DL compares the transmitted triple and its hash value with the triples originally generated by means of the smart contract SC and subsequently generated by means of the distributed ledger DL.

In step 14, the verification result comes from the distrib-uted ledger DL. The distributed ledger DL is designed as an independent instance that supplies the result. One feature of the distributed ledger DL is that it is available online or offline, as it is distributed to different nodes in the network. Thus, verification can be done online or offline with a local, secured and certified copy of the distributed ledger DL.

However, the distributed ledger DL must be online from time to time to be updated for latest changes to the distrib-uted ledger DL. The distributed ledger DL is preferably admission-based in the variant used here.

In step 15, the verification instance VI makes a decision based on the verification result. For this purpose, the veri-fication instance VI generates a decision on the originally requested query. In the present example, the verification instance VI confirms or does not confirm the request, does the user have an "age-over-23"?

In step 16, the requested access from step 1 can be granted or not depending on the decision from step 15. The next time a resource is accessed with the same request, the steps from step 9 can be performed. The prerequisite is that the ID of the user N is not changed.

The individual steps can also be described in Java pro-gram notation as follows:

1. access.restricted.object(ID, ObjID)
2. objID.evidence(age >23)
3. calculateAgeDocumentedAge >23(ID, signed docu-ment)
4. getPublicKey ( )
5. sendPublicKey ( )
6. evidenceSignature (PublicKey)
7. computeAge(limit=23, date of birth)
8. createCryptoSignedProof (blockchain network)
9. sendSignedAgeproof (signed(true/false)
10. forward (ID, CryptoSignedProof23)
11. demand verification (ID2, CryptoSignedProof23)
12. verification (CryptoSignedProof23): true/false
13. voucherValidity( ) true/false
14. verificationResult( ) true/false
15. decision (ID2, ObjID): true/false
16. accessGranted(ID2, ObjID): true/false Another use case is the proof of the general university entrance qualification, where as the user can prove the qualification of the holder of a high school diploma without disclosing details of the examination, such as date, place, grade or other contents of the high school diploma. It is only proven that the user has the general university entrance qualification for which he has received a valid certificate from the smart contract SC.

Another use case is participation in a social assistance program. User N applies for a government benefit and proves that he is entitled to it. To do this, user N has his domestic address checked against his place of residence in his ID card as an true/false statement.

Another use case is vehicle registration, where user N wants to register a car. To do this, he must provide the vehicle registration office with his address and tax informa-tion. The address is given in full at the vehicle registration office. Proof of outstanding taxes of the user N is required by the vehicle registration office. The user N provides his tax identification number. User N himself electronically con-tacts a smart contract SC programmed accordingly. The smart contract SC connects to the tax authorities with reference to the tax identification number of the user N and receives the statement that there are no outstanding tax payments of the user N. The smart contract SC then certifies that the user N has paid the tax. Thereupon, the smart contract SC certifies the result that user N has no tax debts. User N uses this proof without disclosing his tax identifi-cation number during vehicle registration.

Another use case is a certificate of deposit where user N is asked to prove the availability of a certain amount of money in preparation for a transaction (renting/buying a house, buying a car, etc.). The user N uses an appropriately programmed smart contract SC together with details of his bank relationship (account details, credit line of the current account, bank balance) to prove the required amount as available without disclosing the account number, the financial institution and other details.

Another use case is a driver license verification, for which the user N must prove that he is authorized to drive and is at least 24 years old. The method presented here provides proof without disclosing the other details of the driver license of user N. Similarly, the authorization to drive certain vehicles specified in the driving license classes (B, B17, B96, B196, BE, A1, A2, A, AM, C1, C1E, C, CE, D1, D1E, D, DE, L, T) or groups thereof can also be proven without disclosing the other details of user N's driving license.

The variants of the device described above, its structure and operation as pek te, as well as the variants of the method are merely intended to provide a better understanding of the structure, the mode of operation and the properties; they do not limit the disclosure to the embodiment at games. The FIGS. are partially schematic. In some cases, essential properties and effects are shown clearly enlarged in order to clarify the functions, operating principles, technical embodiments and features.

In this context, each mode of operation, each princi zip, each technical embodiment and each feature disclosed in the FIGS or in the text can be freely and arbitrarily combined with all claims, each feature in the text and in the other FIGS, other modes of operation, principles, technical embodiments and features contained in this disclosure or resulting therefrom, so that all conceivable combinations of the described approach are to be to arranged. In this context, combinations between all individual embodiments in the text, i.e. in each section of the description, in the claims and also combinations between different variants in the text, in the claims and in the FIGS. are also included. Also the claims do not limit the disclosure and thus the combinations of all disclosed features among each other. All disclosed features are explicitly cited also individually and in combination with all other features disclosed herein.

The invention claimed is:

1. A method for generating, providing and exchanging a trusted electronic record or certificate in one or more computer resources in a network based on an electronic document concerning a user, comprising the steps:

communicating a restriction of an interaction by an object to the user, proving a non-fulfillment/fulfillment of the restriction by the user using a document;

contacting, by electronic data communication, a blockchain held in a network by the user, the blockchain containing a smart contract that is configured to check whether the document provided by a certification authority and comprising information relating to the user in an electronic format proves that the user has fulfilled the restriction, wherein contacting the blockchain further comprises transmitting, by means of an electronic communication, information by the user about the restriction over the network to the blockchain;

checking, by a miner, the fulfillment of the restriction using the smart contract;

calculating, depending on the result of checking compliance with the restriction, a proof using the smart contract, and generating a certificate of the proof using the smart contract using a cryptographical function, wherein the smart contract is programmed and adapted to send a presence/absence of the fulfillment/non-fulfillment of the restriction after the smart contract has processed the proof, and the smart contract has generated the certificate of the proof using the cryptographic function to the user; and sending the certificate of the proof and the proof using the smart contract to the user through the blockchain, the smart contract being configured to communicate to the user an existence/non-existence of fulfillment/non-fulfillment of the restriction by the user in a form that has the same level of assurance as the document used to verify compliance with the restriction using the smart contract.

2. The method according to claim 1, further comprising, before contacting the blockchain held in the network, initiating the interaction with the object by the user.

3. The method according to claim 1, further comprising, after sending the certification of the proof and/or the proof using the smart contract to the user, sending the received certificate of the proof and/or the proof to a third person by an action to be initiated by the user;

checking a hash value of the proof by the object; and causing, depending on the result of the checking, an execution or denial by the object of the interaction initiated by the user.

4. The method according to claim 1, wherein providing the document comprises at least information concerning the user in an electronic format that is certified, signed and/or authenticated.

5. The method according to claim 1, wherein contacting the blockchain involves over averaging of information by the user using an electronic data communication to identify the user;

to the document; and/or to the smart contract to be used for checking the restriction;

via a network to the blockchain.

6. The method according to claim 1, wherein the user, in order to check the fulfillment of a constraint using the smart contract, sends the document at least partially to the smart contract; and/or accesses data for at least part of the document to the smart contract through the network to the blockchain.

7. The method according to claim 1, wherein for checking the fulfillment/non-fulfillment of the restriction, the smart contract is programmed and adapted to generate a program code or a script with instructions on how to check the fulfillment/non-fulfillment of the restriction, and the smart contract is programmed and adapted to generate a program code or a script with instructions on how to check the fulfillment/non-fulfillment of the restriction, including checking at least one certificate, signature and/or authentication of the document;

calculating the proof based on the result of the verification of the at least one certificate, the at least one signature and/or the at least one authentication of the document; and/or signing of the proof using a cryptographic function by generating a digital certificate of the proof.

8. The method according to claim 1, wherein sending the certificate of the proof through the blockchain to the user comprises transmitting the certificate of the proof using an electronic data communication through the network to store the certificate of the proof in a wallet held in a portable device or a stationary computer resource of the user so that it is accessible to the user for further processing; and/or send the certificate of the proof with or without previous saving in the wallet from the portable device or the stationary computer resource of the user without any action of the user via the network to a third person.

9. The method according to claim 1, wherein providing the document comprises at least the information concerning the user that is certified, signed and/or authenticated in the electronic format by an official authority or a trusted partner using a preferably biometric ID document, and/or information relating at least to the user is stored in an electronic proof of identity and/or an eID server with a functional eID interface for external access.

10. The method according to claim 1, in which the smart contract in the blockchain is programmed and set up to access the information concerning the user in the electronic proof of identity and/or the eID server for checking the restriction, and/or the information concerning the user is stored as a mobile ID in a wallet by the user for sending via the network to the smart contract in the blockchain.

11. The method according to claim 1, wherein the smart contract is validated in nodes of the network and is programmed and arranged to compare in the document information concerning the user with the restriction sent to the smart contract for its fulfillment/non-fulfillment; and/or wherein the smart contract is programmed and set up to carry further information, which can be defined in terms of scope, from the document via information sent to the smart contract.

12. The method according to claim 1, wherein the smart contract is programmed and arranged, to certify, sign and/or authenticate the information concerning the user, and, as far as specified with regard to the scope, further information from the document, and/or to generate new certified, signed, and/or authenticated data elements that are fully verifiable by third parties through independent access to the smart contract in the block chain and verifiable with regard to the authenticity of the data elements.

13. The method according to claim 1, wherein the smart contract is programmed and arranged so that the user initiates the calculation of the proof by the smart contract, the issuance of the certificate of the proof by the smart contract with the aid of a cryptographic function, and/or the sending of the certificate of the proof by the smart contract to the user.

14. The method according to claim 1, wherein as a cryptographic function a public-key cryptography/digital signature and/or cryptographic hash functions are used; and/or wherein for public-key cryptography, a key pair with a private key and a public key mathematically linked to each other by a calculation rule is generated; and/or wherein calculating a proof by the smart contract, and generating a certificate of the proof by the smart contract using the key pair; and/or wherein the key pair is used to create a digital signature, in which the user provides the transaction with the private key and sends the signed message to the smart contract; and/or wherein the smart contract is set up and programmed to sign the certificate of the proof with the digital signature before it is sent; and/or wherein the smart contract is arranged and programmed to check the transaction with the public key of the user and to verify the authenticity of the transaction if the keys correspond to each other; and/or wherein after the transaction has been signed by the smart contract, the transaction is checked for content integrity by the user and/or a third party.

15. The method according to claim 1, wherein the smart contract executes the generation of the certificate of the proof with a cryptographical signature function, wherein a character string of an arbitrary and fixed length is generated from the proof, wherein a signature or hash function is deterministic, and wherein if, starting from the generated signature or hash value, an original proof cannot be determined with reasonable effort, and it is not possible with reasonable effort to find a second, different proof which gives the same signature of the proof, and it is not possible with reasonable effort to find two different proofs which give the same signature of the proof, the cryptographical signature function implements an algorithm based on a SHA-2 or SHA-3 hash function.

16. The method according to claim 1, wherein the blockchain containing the smart contract is implemented as a permission-based public blockchain, a permission-based private blockchain, or a permission-free public blockchain in a distributed ledger.

17. A wallet, implemented as a database in a portable device, which is configured to execute the method according to claim 1 with resources of the portable device, wherein the portable device includes a memory for storing the certificate of the proof transmitted by the blockchain to the user using electronic data communication through the network, and wherein the portable device is configured to store the certificate of the proof in the wallet or forward the certificate of the proof in the wallet by commands issued by a user interface, and/or is configured to transfer the certificate of the proof from the portable device to a third person via the network without an action of the user, and/or is configured to hold information concerning the user as a mobile ID in the wallet to send via the network to the smart contract in the blockchain.

18. A blockchain held in a network, wherein upon execution of an instruction in the network, the blockchain is configured to execute the method according to claim 1.

19. A computer program or script stored in a computer-readable storage medium on one or more computer resources in a network, in an implementation as a blockchain, which is verified by at least one miner, wherein execution of an instruction by the computer-readable storage medium causes the computer program or script to execute the method according to claim 1.

* * * * *